United States Patent [19]
Ferrarin

[11] Patent Number: 5,593,143
[45] Date of Patent: Jan. 14, 1997

[54] UNIVERSAL FENCE POST CONNECTOR

[76] Inventor: James A. Ferrarin, 15025 S. Beaton Rd., Oregon City, Oreg. 97045

[21] Appl. No.: 413,968

[22] Filed: Mar. 30, 1995

[51] Int. Cl.⁶ .............................. E04H 17/14; F16L 3/22; B25G 3/36; F16D 1/00
[52] U.S. Cl. ................. 256/68; 256/59; 256/65; 256/67; 256/DIG. 5; 248/68.1; 248/74.1; 403/362; 403/385; 403/DIG. 9
[58] Field of Search ................. 403/13, 362, 384, 403/385; 256/32, 47, 60, 65, 67, 68, 69, 59, 64, DIG. 5

[56] References Cited

U.S. PATENT DOCUMENTS

| | | |
|---|---|---|
| 2,147,496 | 2/1939 | Nelson . |
| 3,092,407 | 6/1963 | Blonder . |
| 3,565,380 | 2/1971 | Langren .............................. 403/362 X |
| 3,670,468 | 6/1972 | Cordell, Sr. . |
| 3,874,640 | 4/1975 | Wagner et al. . |
| 4,078,754 | 3/1978 | Gould . |
| 4,078,772 | 3/1978 | Carbone . |
| 4,300,852 | 11/1981 | Clark ........................ 403/385 |
| 4,763,879 | 8/1988 | Wasicek et al. . |
| 4,817,877 | 4/1989 | Kreusel .............................. 403/385 X |
| 4,889,322 | 12/1989 | Wagner . |
| 4,979,724 | 12/1990 | Williams . |
| 5,046,705 | 9/1991 | Willimas . |
| 5,356,101 | 10/1994 | Malloy .............................. 256/64 X |

*Primary Examiner*—Blair Johnson
*Assistant Examiner*—Bruce A. Lev
*Attorney, Agent, or Firm*—Klarquist Sparkman Campbell Leigh & Whinston, LLP

[57] ABSTRACT

A universal post connector is disclosed for interconnecting fence posts and braces either of which may be a pipe post or tee post at any horizontal or vertical angle and at any position along the length of each. The universal connector is also adaptable to tee posts and pipe posts of all standard cross-sectional sizes. The preferred embodiment includes a pair of sleeves and a pair of collars to interconnect two tee posts. At least one sleeve is slipped onto each tee post and fastened thereto at any position along the length of the tee post using a fastening device. A collar encircles each sleeve and is clamped at any position along the length of the sleeve. A coupler pivotally interconnects the collars and locks the collars at variable angles with respect to each other. In the case where a pipe post is used in place of a tee post, the collar can be directly clamped to the pipe post without using a sleeve.

16 Claims, 2 Drawing Sheets

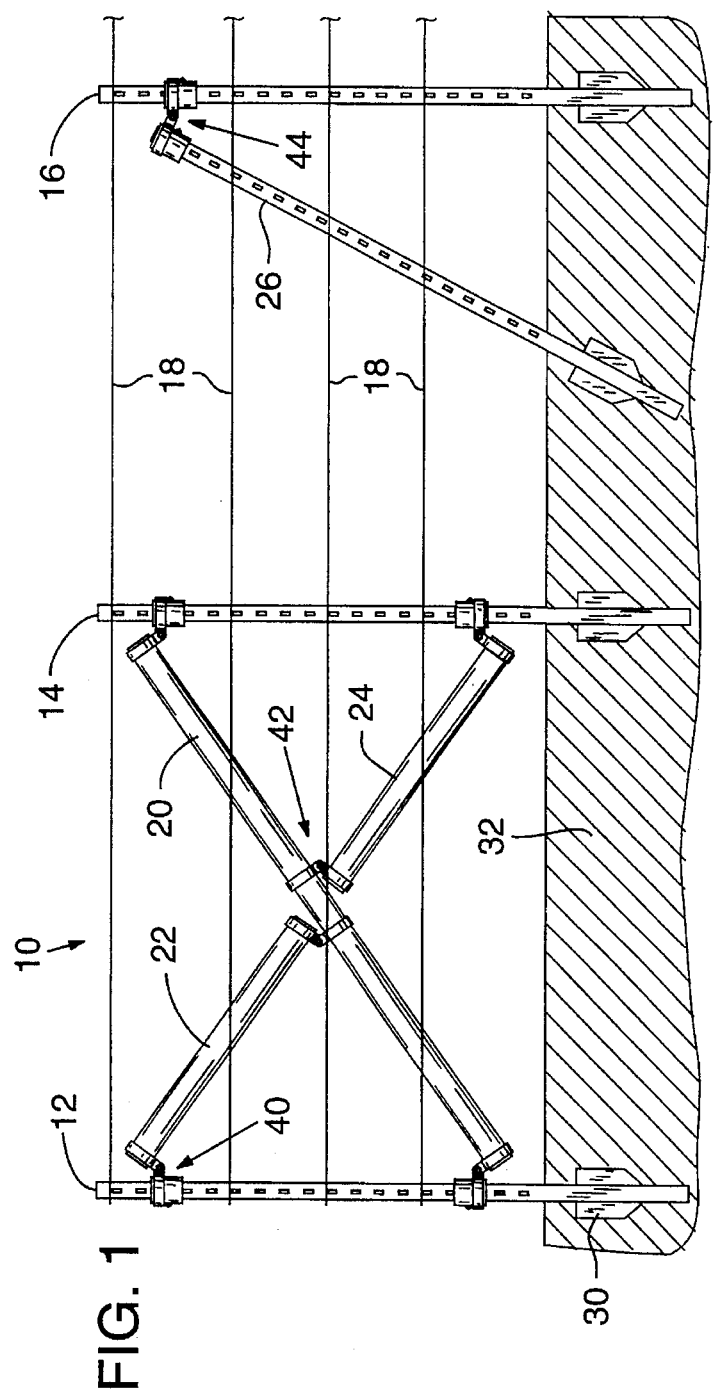
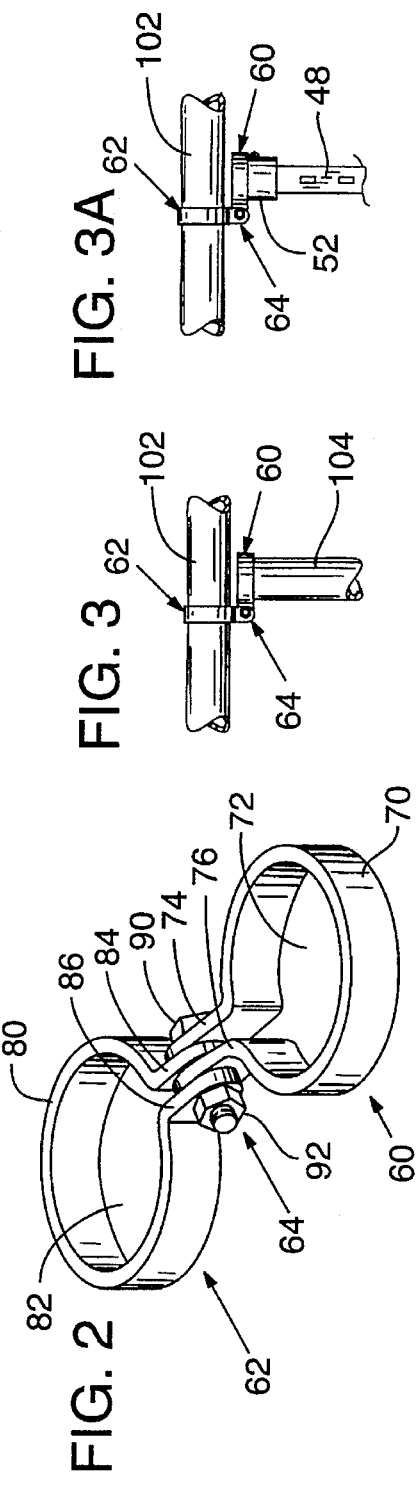

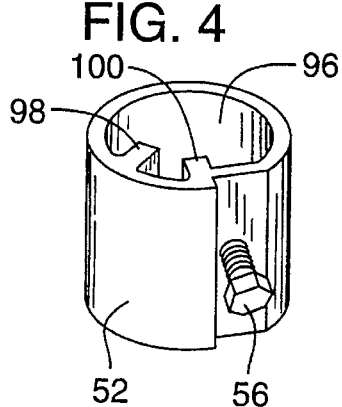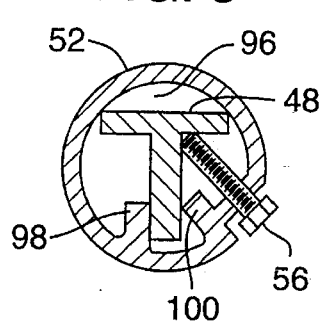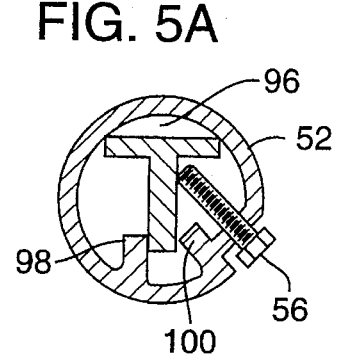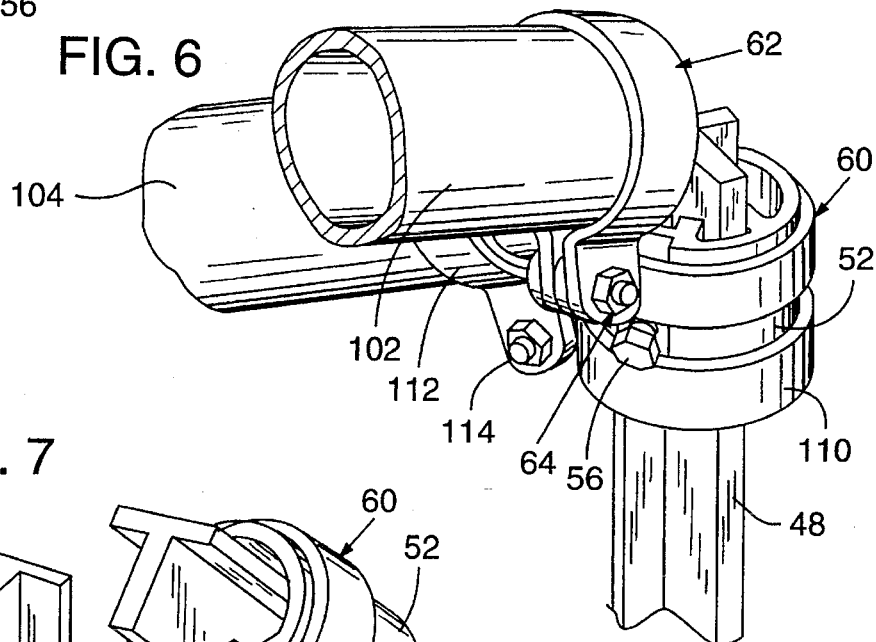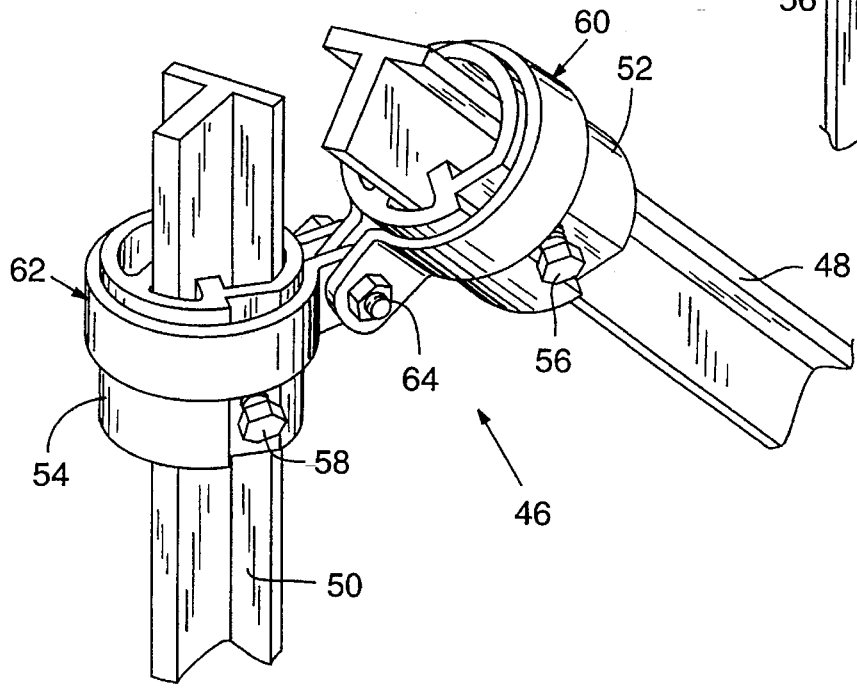

UNIVERSAL FENCE POST CONNECTOR

FIELD OF THE INVENTION

The present invention relates to fence construction, and more particularly to a connector used to attach braces to fence posts.

BACKGROUND OF THE INVENTION

Fencing has a wide variety of purposes such as outlining property boundaries, providing animal enclosures and creating snow barriers. Fences typically consist of upright fence posts, braces, which support the upright fence posts, and barbed wire strung between the posts.

Braces may be attached to the upright posts for a number of reasons. First, bracing maintains the tension in barbed wire connected to the upright posts. Second, braces are used to generally support the fence. Such support is needed to prevent animals from breaking out of the fence or to support the weight of snow in the case where the fence is acting as a snow barrier.

There are several different ways to connect a brace to an upright post. For example, the brace can be connected between adjacent upright posts either perpendicular to each post or on a diagonal. The braces can also extend from one upright post diagonally to the ground.

Several varieties of posts may be used as either upright posts or braces. For example, two types of posts commonly used are tee posts and pipe posts. Tee posts are named because their cross-sectional shape resembles a "T". Tee posts are usually made from metal and have protrusions on one face to allow the connection of barbed wire. Tee posts come in various standard cross-sectional dimensions, such as American or Canadian standard size tee posts.

Pipe posts are sections of round metal pipe. Pipe posts, like tee posts, come in various cross-sectional sizes and are often used to construct fencing on school playgrounds. Unlike tee posts, pipe posts are not readily driven into the ground, so they are usually anchored into concrete within pre-dug post holes.

Connectors are required to attach braces to upright posts. Connecting a brace post to a tee post has traditionally presented problems because of the odd cross-sectional shape of the tee post. Many patents have issued with different bracing connectors. Typically, a connector fits over the tee post and is secured with a wedge, hammered between the connector and tee post, which is difficult to remove once in place. The prior art connectors all seem to have unique advantages but lack the flexibility to interconnect fence posts and braces on steep and irregular terrain, to accept both tee posts and pipe posts, and to adjust to the various cross-sectional sizes of posts, and to interconnect posts and braces at various angles and at various positions along their lengths.

Illustrative of such patents is Wagner, U.S. Pat. No. 4,889,322, which discloses a bracing system having a rectangular collar secured to a tee post by a wedge. A socket is attached to the collar for holding one end of a brace. The opposite end of the brace is attached in a second socket to the next upright tee post in the fence line. The brace must be attached at a fixed angle of either 45 degrees or 90 degrees as dictated by the connector selected. Because only the ends of the brace can attach to the upright tee posts, the spacing between consecutive upright posts is dictated by the length of the brace. According to one embodiment of the connector, a pipe can also be slidably connected to the a post, but again only at a fixed 90° angle and there is no means to clamp the pipe to the tee post.

There are many problems with the Wagner patent-type connector. For example, the brace attaches between the upright posts at a fixed angle of either 45° or 90° but no other angle. This could make it extremely difficult or impossible to construct fencing on steep terrain. Additionally, the length of the brace from the manufacturer dictates the spacing between the upright posts. Often it might be desirable to have closer spacing between posts to have a stronger fence in a certain area. A further problem is that the faces of all tee posts in a fence line must be set exactly parallel to the fence line and each other or else the cross brace will not be aligned to attach to an adjacent upright post. The connector also cannot accept posts with different cross-sectional sizes or connect a pipe post to a pipe post. Finally, the connector is difficult to disassemble because the connector is wedged to the tee post.

Blonder, U.S. Pat. No. 3,092,407, discloses a connection system that attaches a bracing pipe post to an upright pipe post at arbitrary angles, but again only an end of the bracing pipe can be connected to the upright post. The system also does not provide for the use of tee post at all. Additionally, an upright pipe post must be anchored in concrete in the ground, which makes it impractical for use on ranches and farms where large expanses of fencing are required.

Accordingly, there is a need for a universal connector which can attach pipe post to pipe post, tee post to pipe post, or tee post to tee post. Additionally, ideally the connector needs to be able to connect these posts at variable angles relative to each other so that the fencing can easily be erected on any terrain, flat, steep or variable. The connector needs to be able to connect to posts with different cross-sectional sizes. There is also a need for a connector which allows for uniform spacing between upright posts despite the fact that the bracing comes in variable lengths. The connector should also allow the brace post to connect either between consecutive upright posts or attach at one end to the upright post and the other end to the ground. Therefore, the primary objective of the present invention is to provide a fence post-and-brace connection that fulfills all these needs.

SUMMARY OF THE INVENTION

The present invention is a universal post connector for interconnecting fence posts and braces either of which may be a pipe post or tee post at any horizontal or vertical angle and at any position along the length of each. This allows fencing to be constructed on any terrain and with any desired spacing between upright posts. The universal connector is also adaptable to tee posts and pipe posts of all standard cross-sectional sizes and can connect a brace between posts or from a post to the ground.

In a preferred embodiment of the invention, a connector includes a pair of sleeves and a pair of split collars that clamp to the sleeves and are pivotally interconnected. When connecting a tee post to a tee post, one sleeve is slipped onto each tee post and fastened thereto at any position along the length of the tee post using a fastening device such as a set screw. A collar encircles each sleeve and is clamped at any position along the length of the sleeve. Thus, the sleeve serves as an adapter that adapts the collar to the tee post. A coupler pivotally interconnects the collars and locks the collars at any desired angle with respect to each other, thereby interconnecting the two posts at the same angle.

Where one or more pipe posts is being used, a sleeve is not needed to adapt the collar to the pipe post. Instead, the collar is clamped directly to the post any position along the length of the post. In all other respects, the pipe post connection functions in a manner similar to the tee post to tee post connection described previously.

The foregoing and other objects, features, and advantages of the invention will become more apparent from the following detailed description of a preferred embodiment which proceeds with reference to the accompanying drawings.

BRIEF DESCRIPTION OF THE DRAWINGS

FIG. 1 is a portion of a fence illustrating several connector configurations using the invention.

FIG. 2 is a perspective view of a pair of collars used in the FIG. 1 illustration.

FIG. 3 is an illustration of collars used to connect two pipe posts.

FIG. 3A is an illustration of collars and a sleeve used to connect a tee post to a pipe post.

FIG. 4 is a perspective view of a sleeve used in the FIG. 1 illustration.

FIG. 5 is a cross-sectional view of a sleeve with a tee post inserted therethrough.

FIG. 5A is a cross-sectional view of a sleeve showing a different size tee post than used in FIG. 5.

FIG. 6 is an illustration of the connection of a tee post to several pipe posts using the present invention.

FIG. 7 is an illustration of the connection of a tee post to another tee post using the present invention.

DETAILED DESCRIPTION OF A PREFERRED EMBODIMENT

Referring to FIG. 1, wire fencing 10 is shown including upright fence posts 12, 14, and 16 with fence wires 18 strung in tension therebetween and braced by braces 20, 22, 24, and 26. The fence posts are standard tee posts well known in the art. The tee posts include blades 30 at their lower ends driven into ground 32 to resist twisting, withdrawal, and tilting.

The fencing shown includes two types of bracing: cross braces 20, 22, 24 and in-ground brace 26. Brace 20 is a pipe post shown as a cross brace connected at one end to tee post 12 and at the opposite end to tee post 14. Brace 20 is attached at an arbitrary angle with respect to tee posts 12, 14. Brace 22, 24 are also pipe posts, but show a different technique for attaching cross bracing. Brace 22 is attached at one end to tee post 12 and at the opposite end to brace 20. Brace 24 is also connected to brace 20 at one end and at an opposite end to tee post 14. Both brace 22 and 24 are connected to brace 20 and to their respective tee posts 12, 14 at an arbitrary angle.

Brace 26 shows another bracing technique used with the connector of the present invention. Brace 26 has one end attached to the upright post 16 and an opposed end secured in ground 32. Although brace 26 is shown in the same plane as fence 10, brace 26 can be at virtually any horizontal position with respect to tee post 16. Additionally, brace 26 can be attached at any vertical angle.

To connect the described braces to the upright posts, three different connector configurations are shown in FIG. 1. Specifically, connector 40 shows tee post 12 connected to a pipe 22; connector 42 shows brace pipe 24 connected to brace pipe 20; and connector 44 shows tee post 26 connected to tee post 16. Thus, the connector of the present invention can adapt to connecting any type of brace post to any type of upright post.

FIG. 7 shows the connector 46 of the present invention used to attach tee post 48 and 50. The connector includes sleeves 52, 54, fastening devices 56, 58, collars 60, 62 and coupler 64. Sleeve 52 is operable to adapt collar 60 to tee post 48. Sleeve 52 slips over tee post 48 and is slidably connected thereto until fastened at any selected position along the length of the tee post using fastening device 56. Collar 60 encircles sleeve 52 and is slidably connected thereto. Consequently, collar 60 can be rotated horizontally around and slide vertically on sleeve 52 to clamp in any horizontal or vertical orientation. Sleeve 54 slips over tee post 50 and is fastened thereto by fastening device 58 at any position along the length of tee post 50. Collar 62 encircles and clamps to sleeve 54 in a similar fashion to collar 60 described above. Collars 60, 62 are pivotally interconnected by coupler 64, which is operable to lock the collars at variable angles relative to each other and to clamp collars 60, 62 to sleeves 52, 54.

FIG. 2 shows split collars 60, 62 and coupler 64 from connector 46 of FIG. 7. Collar 60 includes strap 70 having a circular shape and containing opening 72 therethrough. Tabs 74, 76, are connected at each end of strap 70 and are aligned parallel to each other. Tabs 74, 76 have holes therein (not shown). Strap 70 is spring biased so that opening 72 can be expanded or contracted to receive pipe posts or sleeves of varying cross-sectional sizes. Expansion and contraction of opening 72 is accomplished by either separating or squeezing tabs 74, 76. Collar 62 includes strap 80 also having a circular shape and having opening 82 therethrough. Tabs 84, 86 are connected at each end of strap 80 and are aligned parallel to each other and to tabs 74, 76. Tabs 84, 86 have holes therein (not shown) which are aligned with the holes in tabs 74, 76 so that the tabs are interconnected in the order of tab 74, 84, 76, and 86. Collar 62 is in all respects similar to collar 60.

Coupler 64 includes a bolt 90 inserted through the holes in tabs 74, 76, 84, and 86, and a nut 92 threadably mounted to bolt 90. Bolt 90 acts as a pin-type connector allowing collars 60, 62 to pivotally rotate relative to each other. Bolt 90 and nut 92 can be tightened squeezing tabs 74, 76, 84, and 86 together to reduce openings 72, 82 thereby clamping sleeve 52 in collar 60 and sleeve 54 in collar 62 (See FIG. 7). The tightening of bolt 90 and nut 92 also simultaneously acts as a locking device by locking the pivotally coupled collars 60, 62 at a variable angle relative to each other. Connector 46 can be disassembled simply by loosening bolt 90 and nut 92 and sliding collars 60, 62 off of sleeve 52, 54 respectively.

FIG. 4 is a side view, and FIG. 5 and 5A are cross-sectional views, of sleeve 52 of FIG. 7 used to adapt tee post 48 to collar 60. Sleeve 52 is cylindrical in shape and defines bore 96 through which a tee post can be received. Sleeve 52 also includes fastening device 56 and inwardly directed flanges 98, 100. Fastening device 56 is threadably inserted through an aperture in the side wall of sleeve 52 and is a screw used to secure the sleeve at any position along the length of the tee post 48. The sleeve 52 has an irregular internal cross-sectional shape which includes two inwardly directed flanges 98, 100. The leg of tee post 48 is inserted between flanges 98, 100 to prevent substantial rotation of the sleeve 52 relative to tee post 48. The bore 96 is operable to receive tee posts with varying cross-sectional sizes including American or Canadian tee posts as shown in FIG. 5 and FIG.

5A. In either case, fastening device 56 can secure the sleeve 52 at any position along the length of the tee post 48.

FIG. 3 shows collars 60, 62 used to connect pipe posts 102, 104 together. Collars 60, 62 can attach to pipe posts 102, 104 at any position along their length. Specifically, collar 60 is positioned at the end of pipe post 104, while collar 62 is positioned near the mid-point of post 102. Coupler 64 is tightened as described above to clamp collars 60, 62 to posts 102, 104. Posts 102, 104 are shown coupled at an angle of 90 degrees, but could be coupled at any angle with respect to each other.

FIG. 3A shows collars 60, 62 used to connect pipe post 102 to tee post 48. Collar 62 can attach to pipe post 102 at any position along its length. Sleeve 52 can attach at any position along the length of tee post 48. Collar 60 can attach at any position along the length of sleeve 52. Specifically, collar 62 is positioned in the middle of post 102, while sleeve 52 is located at the top of tee post 48 and collar 60 is located at the top of sleeve 52. Coupler 64 is tightened as described above to clamp posts 48 and 102 in place. Posts 48, 102 are shown coupled at an angle of 90 degrees, but could be coupled at any angle with respect to each other.

FIG. 6 is illustrative of a tee post 48 connected to two pipe posts 102, 104. Sleeve 52 is secured using fastening device 56 to tee post 48 in a fashion described above. Collars 60, 110 can both be clamped around sleeve 52 while collars 62, 112 can be clamped to posts 102, 104 by the tightening of couplers 64, 114 in a manner already described.

Having described and illustrated the principles of our invention with reference to preferred embodiments thereof, it will be apparent that these embodiments can be modified in arrangement and detail without departing from the principles of the invention.

For example, although the locking device was shown to both lock the pivotally coupled collars and simultaneously clamp the collars when tightened, it will be recognized that two separate devices can be used to perform this function. For example, one device could lock the pivotally coupled collars at a desired angle while another device clamps each of the collars around the sleeve or tee post.

Similarly, the coupling device can be modified to separately clamp each collar, rather than both collars clamping simultaneously.

Moreover, while a threaded screw is used to secure the sleeve to the tee post, other fastening techniques can be used. For example, a wedge or a crimping type device.

Furthermore, while the collar is shown with only one set of tabs, the collar could have additional tabs located thereon allowing for the connection of multiple collars.

Finally, while the sleeve was shown having inwardly directed flanges, the sleeve can be easily modified. For example, the sleeve can have a circular cross-sectional shape without the inwardly directed flanges. In that case, the screw could be used to prevent substantial rotation of the sleeve relative to the tee post.

In view of the wide variety of embodiments to which the principles of our invention can be applied, it should be apparent that the detailed embodiments are illustrative only and should not be taken as limiting the scope of my invention. Rather, I claim as my invention and all such modifications as may come within the scope and spirit of the following claims and equivalence thereto.

I claim:

1. A post connector adapted for pivotally interconnecting a first post to a tee post comprising:

a first collar having an opening therethrough;

a second collar having an opening therethrough adapted for receiving the first post;

a coupler pivotally interconnecting the first collar to the second collar; and a sleeve sized to closely fit within the opening of the first collar and including a fastening member adapted for attaching the sleeve to the tee post, the sleeve defining a bore therethrough adapted for receiving the tee post.

2. The connector of claim 1 wherein the fastening member is adapted to attach the sleeve to the tee post at variable positions along the length of the tee post.

3. The connector of claim 1 wherein the second collar includes a fastener adapted for attaching the second collar to the first post at variable positions along the first post.

4. The connector of claim 1 further including a second sleeve sized to closely fit within the opening of the second collar, the second sleeve including a fastening member and a bore therethrough adapted for receiving the second post, the fastening member being operable for securing the second sleeve to the second post at variable positions along the second post.

5. The connector of claim 1 wherein the first post is a pipe.

6. The connector of claim 1 wherein the coupler is adapted to reduce the opening of the first collar for securing the sleeve in the first collar and is adapted to reduce the opening of the second collar for securing the second collar to the first post.

7. The connector of claim 1 wherein the coupler is adapted to pivotally interconnect the tee post and first post and is operable to lock the collars at variable angles relative to one another.

8. The connector of claim 1 wherein the sleeve is sized to receive tee posts of different cross-sectional sizes.

9. The connector of claim 1 wherein the second collar is sized to receive posts of different cross-sectional sizes.

10. The connector of claim 1 wherein the sleeve includes an irregular internal cross-sectional shape adapted to receive a tee post while restraining the sleeve against substantial rotation relative to the tee post through engagement with the tee post.

11. A post connector adapted to pivotally interconnect a first tee post to a second tee post comprising:

a first collar having an opening therethrough;

a first sleeve including a first fastening member, the first sleeve sized to closely fit within the opening of the first collar and defining a bore therethrough adapted to receive the first tee post;

a second collar having an opening therethrough;

a second sleeve including a second fastening member, the second sleeve sized to closely fit within the opening of the second collar and defining a bore therethrough adapted to receive the second tee post; and a coupler pivotally interconnecting the first collar to the second collar.

12. The connector of claim 11 wherein the first fastening member is adapted to attach the first sleeve to the first tee post at variable positions along the length of the first tee post and the second fastening member is adapted to attach the second sleeve to the second tee post at variable positions along the length of the second tee post.

13. The connector of claim 11 wherein the coupler is adapted to reduce the opening of the first collar for securing the first sleeve in the first collar and adapted to reduce the opening of the second collar for securing the second sleeve in the second collar.

14. The connector of claim 11 wherein the coupler is adapted to lock the collars at variable angles relative to one another.

15. The connector of claim 11 wherein each sleeve is sized to receive tee posts of different cross-sectional sizes.

16. A post connector adapted to pivotally interconnect a first tee post to a second tee post comprising:

a first collar having an opening therethrough;

a first sleeve including a first fastening member, the first sleeve sized to closely fit within the opening of the first collar and defining a bore therethrough adapted for receiving the first tee post, the first fastening member adapted to fasten the first sleeve at variable positions along the length of the first tee post;

a second collar having an opening therethrough;

a second sleeve including a second fastening device, the second sleeve sized to closely fit within the opening of the second collar and defining a bore therethrough adapted for receiving the second tee post, the second fastening member adapted to fasten the second sleeve at variable positions along the length of the second tee post; and a coupler pivotally interconnecting the first collar to the second collar and adapted to lock the collars at variable angles relative to one another, the coupler adapted to reduce the opening of the first collar for securing the first sleeve in the first collar and to simultaneously reduce the opening of the second collar for securing the second sleeve in the second collar.

* * * * *